US008645253B2

(12) United States Patent
Krull et al.

(10) Patent No.: US 8,645,253 B2
(45) Date of Patent: Feb. 4, 2014

(54) METHOD AND SYSTEM FOR GENERATING A VALUATION METRIC BASED ON GROWTH DATA FACTORS

(75) Inventors: Steven Krull, East Meadow, NY (US); Michael G. Thompson, Huntington Bay, NY (US)

(73) Assignee: Thomson Reuters (Markets) LLC, New York, NY (US)

( * ) Notice: Subject to any disclaimer, the term of this patent is extended or adjusted under 35 U.S.C. 154(b) by 1040 days.

(21) Appl. No.: 11/099,840

(22) Filed: Apr. 5, 2005

(65) Prior Publication Data

US 2006/0224486 A1 Oct. 5, 2006

(51) Int. Cl.
*G06Q 40/00* (2012.01)
(52) U.S. Cl.
USPC .......................................... 705/36 R; 705/35
(58) Field of Classification Search
USPC ...................................................... 705/35–45
See application file for complete search history.

(56) References Cited

U.S. PATENT DOCUMENTS

| 2003/0018556 | A1 | 1/2003 | Squyres | |
|---|---|---|---|---|
| 2004/0225586 | A1* | 11/2004 | Woods et al. | 705/35 |
| 2005/0080704 | A1* | 4/2005 | Erlach et al. | 705/36 |
| 2006/0015425 | A1* | 1/2006 | Brooks | 705/35 |
| 2006/0089896 | A1* | 4/2006 | Levkovich et al. | 705/37 |
| 2006/0116941 | A1* | 6/2006 | Lombardo | 705/35 |

OTHER PUBLICATIONS

Inflation Illusion and Stock Prices, Campbell and Vuolteenaho, May 2004, The American Economic Review, vol. 94, No. 2.*
Fight the Fed Model; Clifford Asness; The Journal of Portfolio Management, Fall 2003.*
Federal Reserve Bank of Minneapolis Quarterly Review; vol. 24, No. 4, Fall 2000, pp. 3-19; The Declining U.S. Equity Premium; McGrattan; Jaganathan.*
Title: "Fool on the Hill; Investment Tools"; by Warren Gump, Dec. 22, 1998.*

* cited by examiner

*Primary Examiner* — Hani M Kazimi
*Assistant Examiner* — Abhishek Vyas
(74) *Attorney, Agent, or Firm* — Valenti, Hanley & Robinson, PLLC; Kevin T. Duncan

(57) ABSTRACT

The present invention relates to a system, method and apparatus for evaluating a variety of financial information, determining a valuation metric, and distributing the valuation metric to system users. The valuation metric distribution may be configured by an administrator for automatic distribution of the valuation metric to system users. Alternately, a system user may log onto a central server to access the valuation metric, based on administrator defined or user-customized system data. The valuation characteristic provides a system user with a metric that may be used to assist in allocating the user's financial resources. The metric is determined by analyzing three main types of financial indicators, specifically an earnings-yield factor, an interest factor and a growth indicator.

39 Claims, 6 Drawing Sheets

METHOD AND SYSTEM FOR GENERATING A VALUATION METRIC BASED ON GROWTH DATA FACTORS

FIELD OF THE INVENTION

The invention relates to the field of financial information data management. More specifically, the invention relates to a system and method for generating a risk valuation metric based on an analysis of growth data factors.

BACKGROUND INFORMATION

Generally, a primary goal of the financial industry relates to obtaining better methods for analyzing current/historic data to correlate a present/future value for financial instruments. More specifically, financial data analysis often entails examining past performance data in order to predict future performance. One exemplary type of analysis is used to determine a valuation metric that assesses a risk/reward ratio between current stock valuations and current bond valuations. The valuation metric provides a way to quantify whether the stock market is over or under valued, as compared to current interest rates associated with bonds. From this determination, it is possible to determine a relative value, as a valuation metric that is associated with a risk level of bonds, as opposed to a risk level of stocks. An investor may ultimately utilize the valuation metric to evaluate how their current financial portfolio is distributed between various financial instruments, with respect to their individual risk tolerance (i.e., whether based on the current state of the financial markets, their financial resources would potentially provide a better if they held more stocks than bonds).

A conventional valuation metric is based on a comparison of the 10-year US Treasury note and the forward operating earnings per share average for the Standard & Poor's 500 stock index, which is widely known as the Fed Model (although the United States Federal Government has not officially adopted the metric). Essentially, the Fed model is a valuation metric that quantifies when the forward earnings yield on the S&P 500 is less than the yield associated with a 10-year bond. As such, the Fed model valuation metric is a tool that may be used to determine how to distribute assets within an investor's portfolio.

However, the Fed Model has at least one major flaw—even though the forward earnings yield of the S&P 500 is factored in to the model, the Fed model does not directly account for growth of stocks in determining a valuation. Accordingly, the Fed model does not account for future growth, which is one of the primary advantages of investing in stocks.

SUMMARY OF THE INVENTION

The invention provides an efficient system and method for determining and distributing a stock/bond valuation metric, wherein the metric accounts for the future growth of the equities. More specifically, the invention relates to a method and system for (a) establishing the parameters used to determine the valuation metric; (b) calculating the valuation metric; as well as (c) distributing the valuation metric.

The present invention provides, inter alia, a networked system configured to determine and distribute a valuation metric. The determination processing may be configured by either an administrator or a system user to generate a generic valuation metric or a customized valuation metric based on system user inputs and/or characteristics. Further, once the valuation metric has been determined, the administrator and/ or the system user may format and distribute the metric based on the needs of the system user.

Other and further aspects of the invention will become apparent from the following detailed description with reference to the accompanying drawings.

Figure 1:
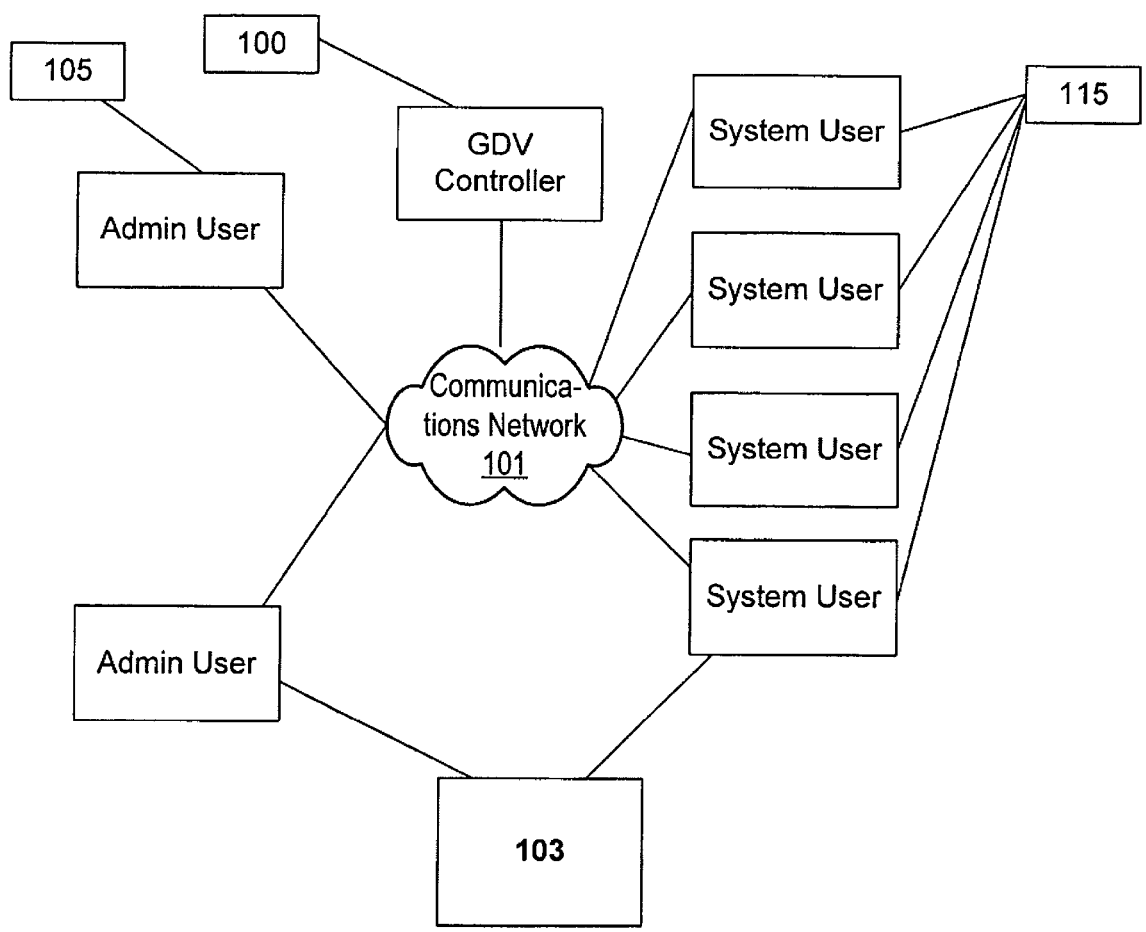
FIG. 1 illustrates an exemplary network configuration associated with an implementation of a Growth Valuation Controller (GVC).

With reference to the figures, various embodiments of the present invention will now be shown and described. The leading reference number for each item designates the first figure in which that item has been introduced.

DETAILED DESCRIPTION OF THE INVENTION

In the following description of various embodiments of the invention, reference is made to the accompanying drawings, which form a part hereof, and in which is shown by way of illustration various embodiments in which the invention may be practiced. It is to be understood that other advancing embodiments may be utilized, and structural and functional modifications may be made, without departing from the scope of the present invention.

Overview

The invention provides an efficient method and system for determining and distributing a financial valuation metric determined based on an equities factor, a interest factor and a future growth factor. As will be discussed in greater detail below and with regard to the figures, the invention determines a financial valuation metric, while accounting for a future growth characteristic associated with equities (e.g., stocks). Further, the invention may be configured to assist in portfolio management based on such a determination. The financial valuation metric may be determined based on factors customized either by system administrators or by the system users themselves. Furthermore, a valuation metric distribution method may be customized based on the individual needs of a system user.

Financial Valuation Market Model

As discussed above, the Fed Model is one method of determining whether the stock market is either over-valued or under-valued. Based on this type of determination, it is possible to provide guidance for investors regarding whether an investor's resources are better invested in stocks or bonds at a particular point in time. However, the Fed Model does not directly account for the future growth of stocks as part of the valuation metric. In contrast, the invention generates a valuation metric that may serve as the basis for portfolio weighting that does account for a future growth characteristic in determining the metric.

According to an embodiment of the invention, the valuation metric is based on three factors—namely, an earnings yield, a growth rate, and an interest rate of fixed income securities. More specifically, one implementation of the invention is based on the forward earnings yield associated with the S&P 500 index, a 20-year historical average growth rate, and the interest rate associated with the 10-year US Treasury note/bond. These financial indicators (factors) have been selected to provide a robust valuation metric based on a diverse field of factors. The breadth and generality of the factors used to determine the valuation metric assist in determining an accurate reflection of the current financial state. However, it is to be understood that the factors for determining the valuation metric are not limited to these three financial indicators.

Various implementations may be customized to determine a valuation metric by an individual system user, based on their needs and/or current financial holdings. For example, instead of implementing an earnings-yield factor, such as the P/E ratio associated with the S&P 500, a user may select any other number of P/E ratios to determine the valuation metric. For example, as the forward P/E is based on analyst estimates and computed for an index such as the S&P 500, alternate indices may be used for the calculation, such other domestic or foreign broad-based indexes like the Dow Jones Industrial Average, the Financial Time Stock Exchange (FTSE) 100 or the Morgan Stanley Capital International Europe, Australasia Far East (MSCI EAFE) index. Alternately, the earnings-yield factor may be based on more narrowly based indexes such as sector or industry indexes, value or growth indexes, and/or large, mid, small or micro-cap indexes. In alternate implementations, the factors may be aggregated to create a single factor based on weighting earnings-yield data associated with several indexes.

In addition to accounting for the type and breadth of index factored into the determination, the data sample duration may also be factored into the equation. Data based on samples taken over greater durations of time may minimize the affects of minor volatilities associated with the financial values taken on a micro-scale. However, it is necessary to strike a balance between accurately accounting for future trends associated with a given index and the increased uncertainty associated with future estimates in the present geo-political environment. Accordingly, analyst estimates for the earnings-yield factor may include forward looking data covering durations including, but not limited to 12, 18 or 24 months.

Similarly, it is to be understood that a variety of growth factors may be chosen and implemented as part of the valuation metric determination. In one embodiment of the invention, the 20-year historical average growth rate is implemented. Alternately, a simple historical compound average consisting of all available data collected over rolling periods (e.g., the most recent five, ten or twenty year periods) may be implemented as the growth rate factor associated with specific equities or equity indexes.

In additional implementations, the growth rates may be weighted to emphasize or de-emphasize certain periods of time. By weighting certain periods of time, it is possible to represent long term trends more accurately. By way of example only, a system administrator implementing a 20-year historical growth average may want to de-emphasize a certain period of time such as the period of time around Sep. 11, 2001, which may skew or adversely affect the overall average. Alternately, a system administrator using a 20-year growth average may want to emphasize the growth experienced within the most recent five-year period. As will be discussed in greater detail below, system administrators/system users may be provided with a significant amount of customization to address an individual client's specific needs and financial situation. It is also possible to further customize the system to produce a valuation metric that is based on growth factors such as operating earnings, cash flow, free cash flow, and/or other income statement based variants, instead of or in addition to the growth factors discussed herein.

Furthermore, the interest rate associated the interest-bearing instrument factors may be selected from a diverse number of instruments to better suit the needs and financial situation of an individual client. By way of example only, instead of implementing the interest-bearing instrument factor as the interest rate associated with the 10-year US treasury note/bond, any number of other interest rates associated with other debt market instruments may be implemented. Exemplary debt market instruments may include instruments from both public and/or private institutions such those issued by government agencies, foreign/domestic corporations and/or foreign governments.

In a manner similar to the growth and earnings-yield factors, the interest-bearing instrument factor selected may involve a wide variety of durations, including but not limited to 2, 5, 10, 15, or 30-year durations. Again, the administrators may make a selection based on a number of factors, but the end result involves attempting to obtain a viable valuation metric that accurately reflects the current state of the balance between equities and interest-bearing instruments.

According to an embodiment of the invention, the valuation metric may be based on the following equation:

Valuation Metric=Earnings Yield+Growth Rate−Interest Rate

Where the Earnings Yield in an implementation is defined as:

1/(P/E)

where P/E refers to the Price-to-Earnings Ratio. The growth rate is an estimate of future earnings growth based on historical data and the growth expectations of security analysts, and the interest rate refers to the yield-to-maturity on a selected fixed-income security.

FIG. 1 illustrates an exemplary implementation of the system. By way of example only, the system is based on a Growth Valuation Controller (GVC) 100. The GVC is connected via a communication network 101, such as the internet, with user nodes 103. The user nodes 103 may be configured to as either as administrative user nodes 105 or as system user nodes 115. The user nodes 103 facilitate instant remote access by administrative/system users 105/115, as well as a significant degree of customization and flexibility.

Administrative System

Figure 2:
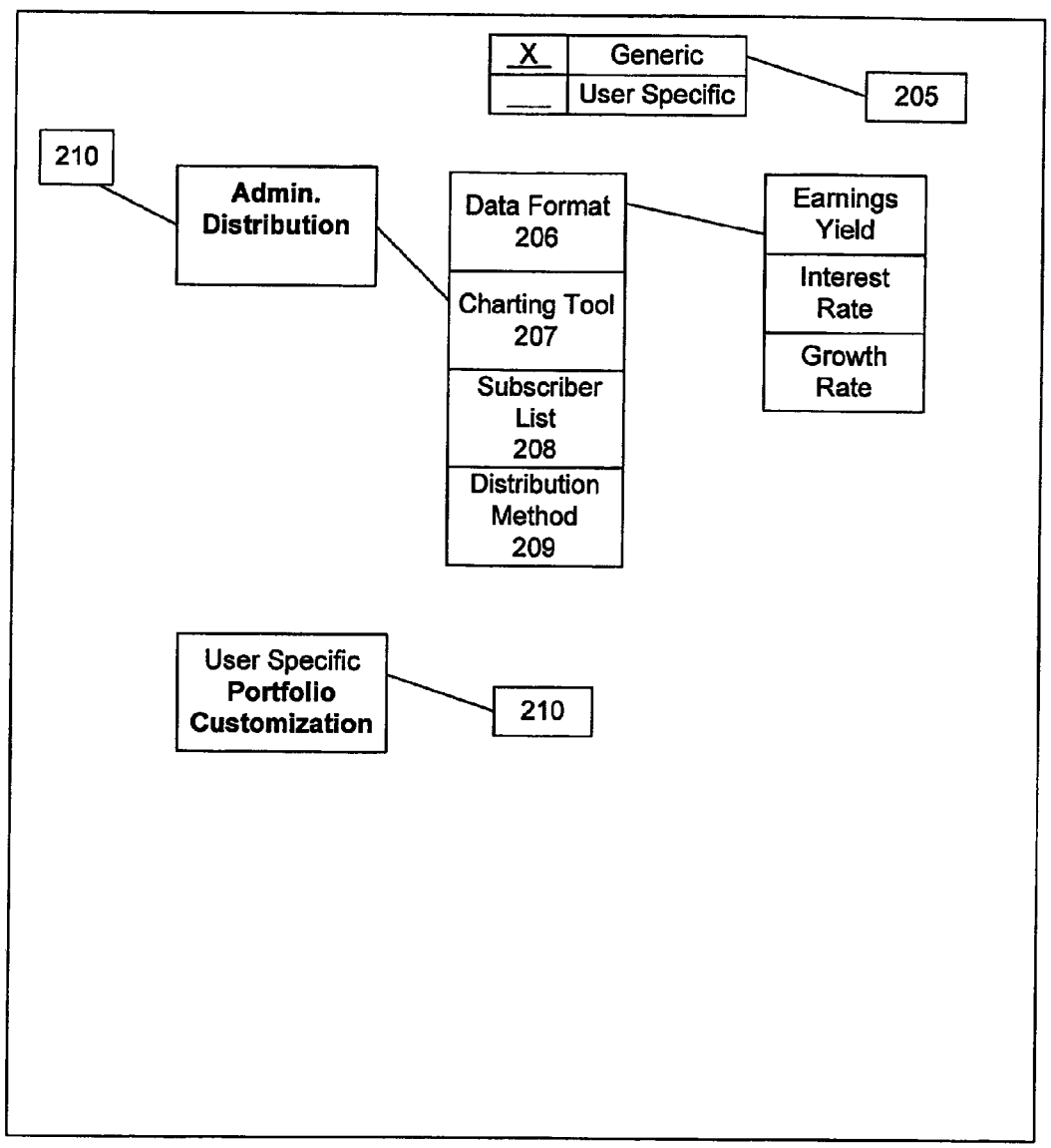
FIG. 2 illustrates an internet based administration interface for an administrative user to interact with the system.

FIG. 2 illustrates an exemplary administrator interface 200 for an administrator to interact with the GVC 100. As illustrated, after logging onto the system, the administrator user 105 may be provided with a series of administrative options 205-210 used to configure the valuation metric determination procedure. These options may be presented to the administrator 105 as an internet navigational window or in a local software program stored on an administrative user node 105 that transmits data to the GVC 100.

Exemplary administrative system options may include a generic/system user specific valuation process 205. More specifically, an administrator 105 may use the system to determine a generic valuation metric based on broad financial indicators, such as those discussed above. The administrator 105 is provided with data format options that facilitate selection of a the valuation factors for a series of actual financial values (i.e., the current percentage yield on a 10-year treasury bond, the current earnings yield of the S&P 500, etc. . . ) as option 206. The system control window may also be configured to present an administrator with the option to implement weighting of various selected economic values in option 206. In order to assist in facilitating optimization of the data selection in option 206, the administrator have access to a financial charting tool 207 for comparing various financial data points over a range of durations of time. Charting tool 207 provides an administrator 105 with graphical charts that may include a wide variety historical financial information. As such, the administrator 105 may be easily determine a robust set of data factors over a representative duration of time that are suited to the needs of a group of subscribers.

As discussed above, the system is directed to both determining the valuation metric, as well as distributing the valuation metric. Options 208 and 209 assist with distributing the valuation metric once it is determined. As discussed above, it is possible to use different factors to calculate a generic valuation metric. An administrator may create several valuation metrics that reflect based by varying the levels of volatility associated with the different factors. As such, system users (subscribers) 115 may indicate what level of risk/volatility they are comfortable with. The administrator 105 may manage a subscriber list 208 and distribute different generic valuation metrics based on the varying subscriber risk exposure parameters.

Furthermore, an administrator 105 may customize the distribution format and/or the frequency of valuation metric report. By way of example only, the administrator 105 may configure a customized web page hosted by the system 100 that is available to the subscriber 115 via the internet. Alternately, the administrator 105 may configure the system to periodically deliver an electronic report of financial information that includes the valuation metric. It is to be understood that the methods discussed herein are exemplary and that administrator 105 may configure the system to report the valuation metric in any number of subscriber/administrator defined formats. In an alternated embodiment of the invention system report files may be automatically attached and sent via email to all system users associated with a particular subscriber list.

An administrator also has the ability to select a specific valuation option 210 active for qualified system users. Once enabled, the administrator may select factors that are selected based on the specific needs/financial resources of an individual system user 115 and their specific financial holdings. Alternately, the administrator may enable the system user themselves to access the system 100 and determine the valuation factors for themselves (discussed in greater detail below with regard to FIGS. 4 and 5).

Figure 3:
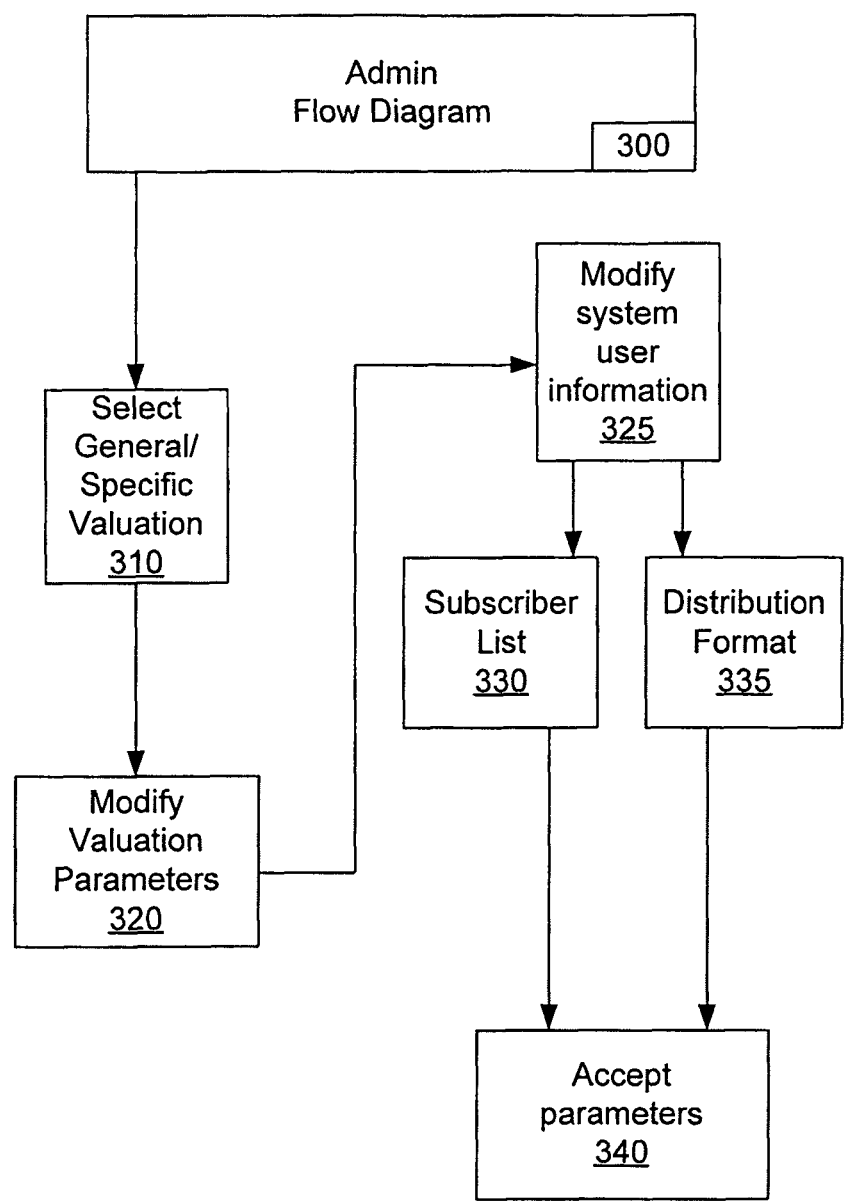
FIG. 3. is a flowchart illustrating administrative user interactions with the system in accordance with an implementation of the invention.

FIG. 3 is an administration flow diagram 300 illustrating exemplary administrative user 105 interactions with an implementation of the system 100. By way of example only, upon logging onto the system 100, an administrator 105 must first determine whether they are going to modify/create a general (directed to a group of subscribers 115) or a specific (directed to an individual) valuation metric in step 310. In step 320, the administrator 105 interacts with the system 100 to determine the factors that will be used to calculate the valuation metric.

After establishing the valuation factors in step 320, the administrator is presented with the option to modify the system user characteristics in step 325. For example, the administrator 105 may enable the system user 115 to access a customized financial management web page shown in FIG. 4 (As will be discussed in greater detail below, the system user web page may be configured to the allow an individual system user to interact with financial database information in order to determine and customize the valuation metric to meet their individual needs). Further, the system 100 allows an administrator 105 to modify individual system user characteristics, including but not limited to, subscriber lists in step 330. The administrator may modify the system user's information in step 330 designated subscription frequency or subscription catalogue (i.e., a system user may register to receive a single or multiple general valuation metrics, as well request receiving updated valuation information at a certain interval). The administrator may also modify the distribution characteristics associated with a system user 115 (e.g., register a system user to receive emailed valuation metric reports). After the administrator 105 has configured the valuation parameters, the administrator may execute a system update in step 340 accepting the updated parameters.

Figure 4:
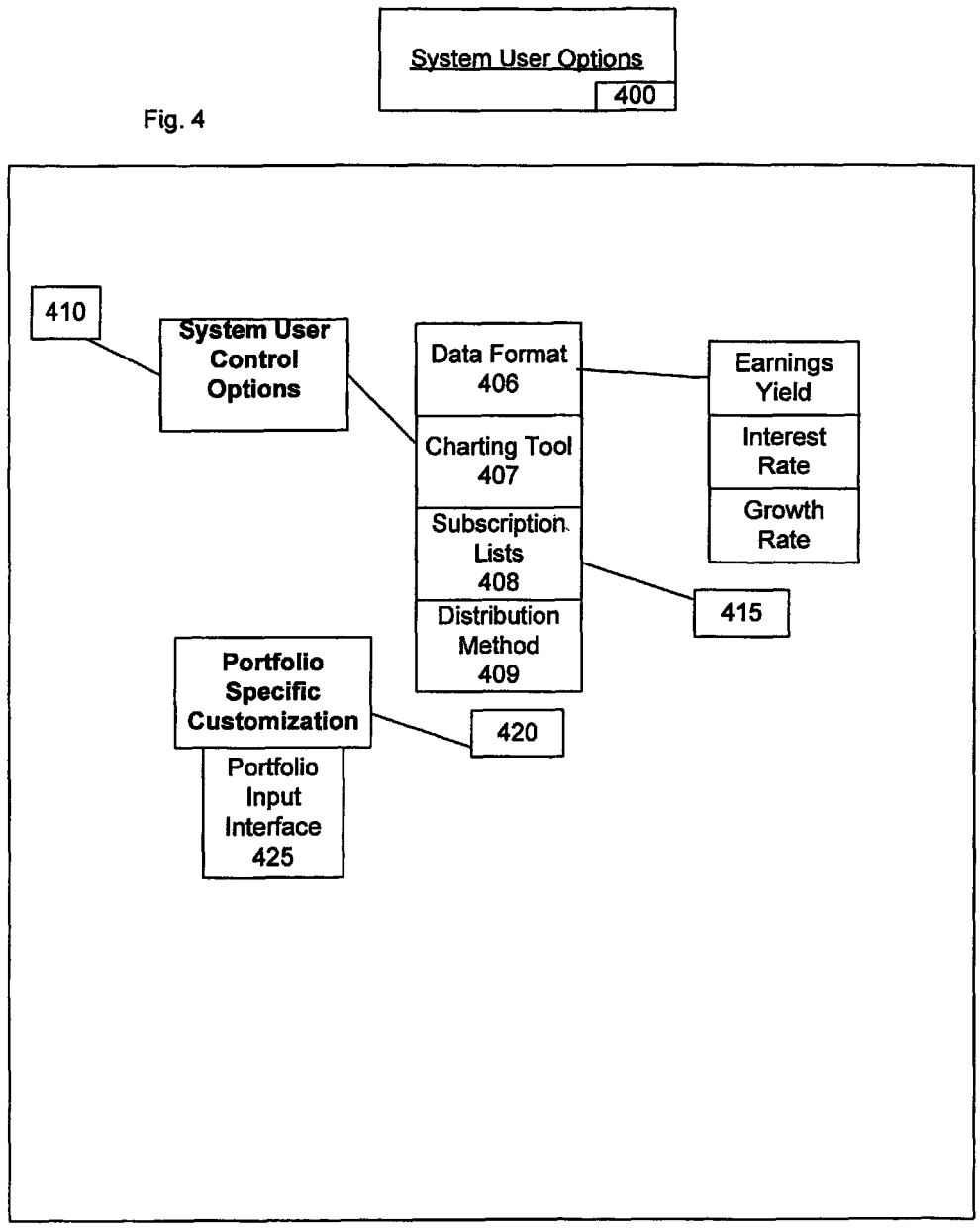
FIG. 4 illustrates an internet based user interface for a system user to interact with the system.

FIG. 4 is an exemplary illustration of a system user specific financial web page accessible via a communication network. Some of the administrative functionality discussed above is also available to the individual system user 115. For example, a system user 115 may indicate whether they want to create/modify the data factors used to calculate the valuation metric in option 406. In order to assist in determining which values to implement as the earning yield, growth rate and interest rate, the GVC may be configured to provide access to both a charting tool configured to display financial data over various durations of time, as well as access to a historical financial database as option 407.

In the event that the system user 115 does not want to customize the factors themselves, option 408 provides the system user 115 with the capability to register for general valuation metric(s). More specifically, system user 115 may select general valuation metrics from a catalogue of metrics. The catalogue may be configured according to any number of metric parameters or by predetermined risk levels. The system user 115 may also indicate a subscription frequency that corresponds to the frequency the metric data is updated and/or reported to the system user 115

The system user options 400 also include some additional functionality provided specifically to the end user. The GVC may be configured to provide a system user 115 with portfolio specific metrics in option 420, wherein the system user 115 provides financial information related to their current financial holdings. The system determines the valuation metric as discussed above and provides the system user with a graphicalltextual analysis based on their holdings, in light of the determined valuation metric. Accordingly, the system user 115 is able to make informed future financial decisions based on the determined valuation metric as directly applied to their holdings. The portfolio specific option 420 is enabled with a portfolio input interface 425. In some implementations the portfolio specific option may be linked with existing financial databases to provide additional analysis and recommendations for future financial decisions.

Figure 5:
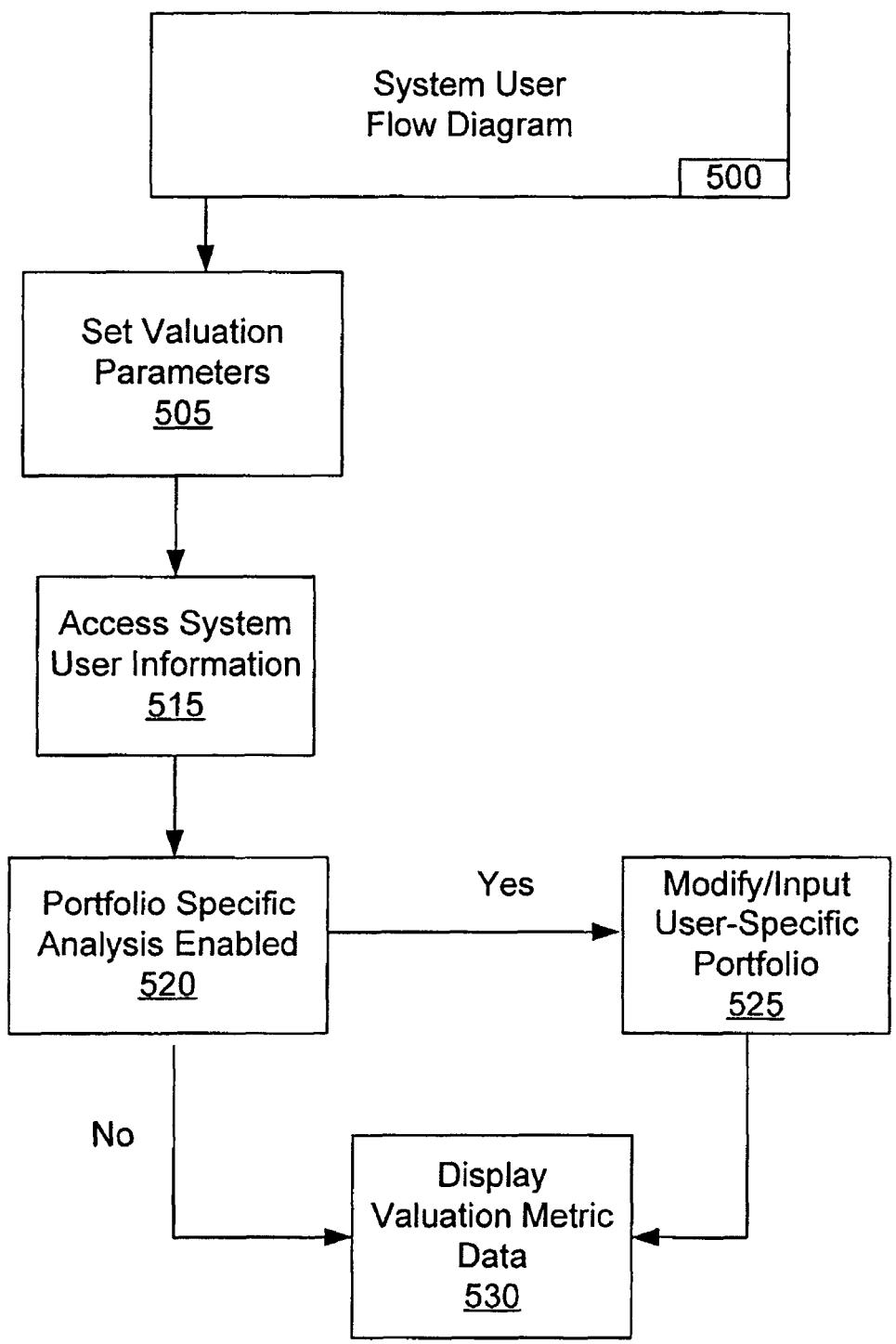
FIG. 5 is a flowchart associated illustrating system user interactions with the system in accordance with an implementation of the invention.

FIG. 5 is system user flow diagram 500 illustrating exemplary system user 105 interactions with an implementation of the system. After logging onto the system, a system user 115, may customize the valuation parameters as discussed above in step 505. The system user 115 can further customize the system user information, such as registering for general valuation metric subscriptions and setting the report receipt frequency in step 515. If it is enabled in step 520, the system user may modify and/or input user-specific financial holding information in step 535. Alternately, if the portfolio specific option 420 is not enabled or selected as determined in step 520, the system user may review/generate historical valuation metric data by selecting the valuation parameters from a linked historical financial database. The system displays the calculated valuation metric or historic data metric in step 530.

Growth Valuation Controller

Figure 6:
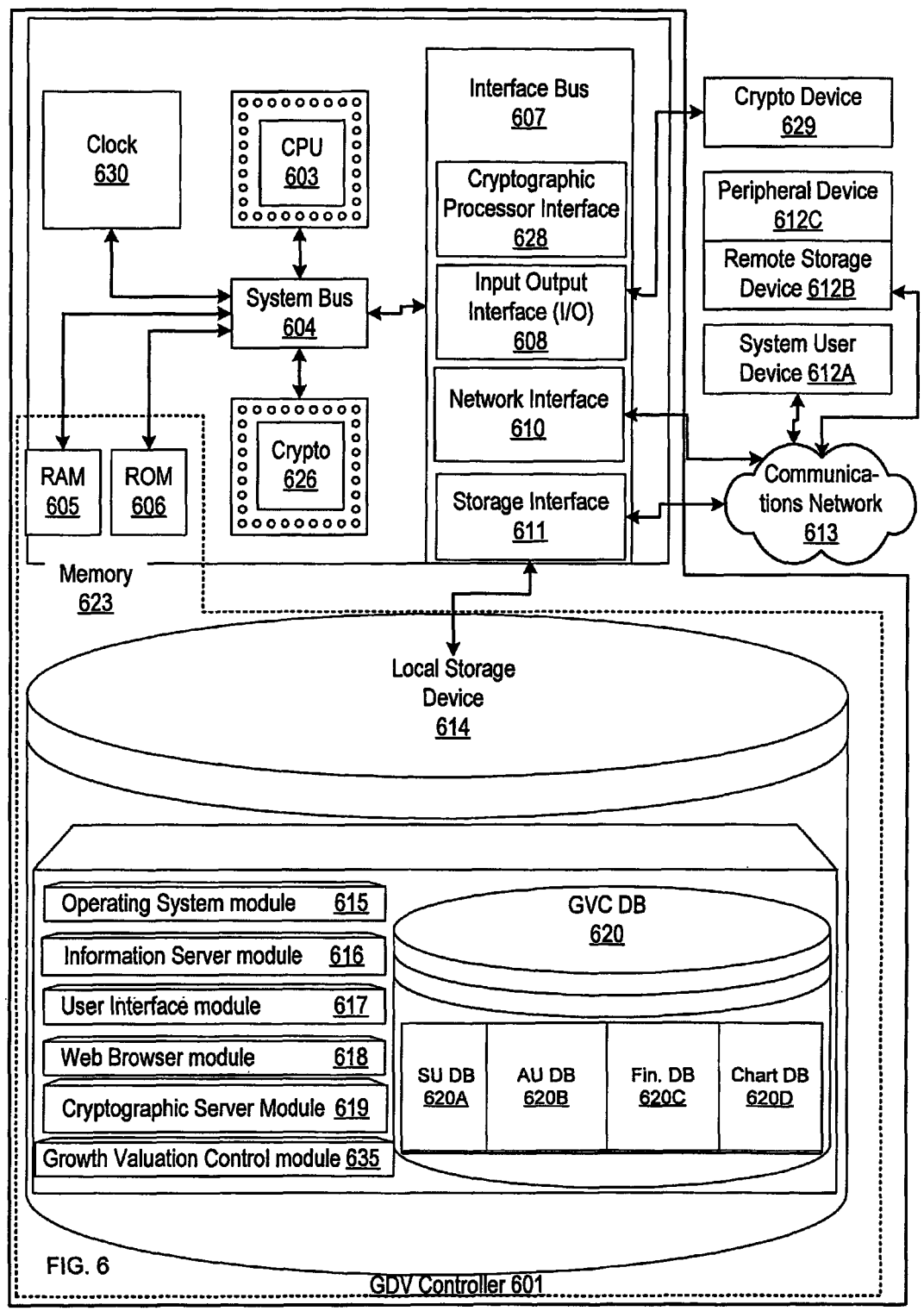
FIG. 6 is an exemplary diagram illustrating hardware components and software modules for an embodiment of the invention.

FIG. 6 is of a block diagram illustrating an embodiment Growth Valuation Controller (GVC) 601. In this embodiment, the GVC 601 may serve to process, store, search, serve, identify, instruct, generate, match, and/or update securities related data.

In one embodiment, the GVC 601 may be connected to and/or communicate with entities such as, but not limited to: one or more users from user input devices 612A; remoter storage devices 612B; peripheral devices 612C; and/or a communications network 613. The GVC may even be connected to and/or communicate with a cryptographic processor device 628.

A GVC 601 may be based on common computer systems that may comprise, but are not limited to, components such as: a computer systemization connected to memory 629.

Computer Systemization

A computer systemization may comprise a clock 630, central processing unit (CPU) 603, a read only memory (ROM) 606, a random access memory (RAM) 605, and/or an interface bus 607, and most frequently, although not necessarily, are all interconnected and/or communicating through a system bus 604. Optionally, the computer systemization may be connected to an internal power source. Optionally, a cryptographic processor 626 may be connected to the system bus 604. The system clock 630 typically has a crystal oscillator and provides a base signal. The clock 630 is typically coupled to the system bus 604 and various clock multipliers that will increase or decrease the base operating frequency for other components interconnected in the computer systemization.

The clock and various components in a computer systemization drive signals embodying information throughout the system. Such transmission and reception of signals embodying information throughout a computer systemization may be commonly referred to as communications. These communicative signals may further be transmitted, received, and the causes of return and/or reply signal communications beyond the instant computer systemization to: communications networks, input devices, other computer systemizations, peripheral devices and/or the like. Of course, any of the above components may be connected directly to one another, connected to the CPU 603 and/or organized in numerous variations employed as exemplified by various computer systems.

The CPU 603 comprises at least one high-speed data processor adequate to execute program modules for executing user and/or system-generated requests. The CPU may be a microprocessor such as AMD's Athalon, Duron and/or Opteron; IBM and/or Motorola's PowerPC; Intel's Celeron, Itanium, Pentium, Xeon, and/or XScale; and/or the like processor(s). The CPU interacts with memory through signal passing through conductive conduits to execute stored program code according to conventional data processing techniques. Such signal passing facilitates communication within the GVC and beyond through various interfaces. Should processing requirements dictate a greater amount speed, mainframe and super computer architectures may similarly be employed. Alternatively, should deployment requirements dictate greater portability, smaller Personal Digital Assistants (PDAs) may be employed.

Power Source

The power source may be of any standard form for powering small electronic circuit board devices such as the following power cells: alkaline, lithium hydride, lithium ion, nickel cadmium, solar cells and/or the like. Other types of AC or DC power sources may be used as well. In the case of solar cells, in one embodiment, the case provides an aperture through which the solar cell may capture photonic energy. The power cell is connected to at least one of the interconnected subsequent components of the GVC thereby providing an electric current to all subsequent components. In one example, the power source is connected to the system bus component 604. In an alternative embodiment, an outside power source is provided through a connection across the I/O 608 interface. For example, a USB and/or IEEE 1394 connection carries both data and power across the connection and is therefore a suitable source of power.

Interface Adapters

Interface bus(ses) 607 may accept, connect, and/or communicate to a number of interface adapters, conventionally although not necessarily in the form of adapter cards, such as but not limited to: input output interfaces (I/O) 608, storage interfaces 611, network interfaces 610, and/or the like. Optionally, cryptographic processor interfaces 628 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 611 may accept, communicate, and/or connect to a number of storage devices such as, but not limited to: storage devices 614, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 610 may accept, communicate, and/or connect to a communications network 613. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 610 may be used to engage with various communications network types 613. For example, multiple network interfaces may be employed to allow for the communication over broadcast, multicast, and/or unicast networks.

Input Output interfaces (I/O 608 may accept, communicate, and/or connect to user input devices 612A, remote storage device 612B, peripheral devices 612C, cryptographic processor 626, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, composite, digital, Digital Visual Interface (DVI), RCA, S-Video, VGA, and/or the like; wireless; and/or the like. A common output device is a video display, which typically comprises a Cathode Ray Tube (CRT) or Liquid Crystal Display (LCD) based monitor with an interface (e.g., DVI circuitry and cable) that accepts signals from a video interface. The video interface composites information generated by a computer systemization and generates video signals based on the composited information in a video memory frame. Typically, the video interface provides the composited video information through a video connection interface that accepts a video display interface (e.g., a DVI connector accepting a DVI display cable).

User input devices 612A may be card readers, dongles, finger print readers, gloves, graphics tablets, joysticks, keyboards, mouse (mice), trackballs, trackpads, retina readers, and/or the like.

Peripheral devices 612C may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, visors, and/or the like.

It should be noted that although user input devices and peripheral devices may be employed, the GVC may be embodied as an embedded, dedicated, and/or headless device, wherein access would be provided over a network interface connection.

Cryptographic units such as, but not limited to, microcontrollers, processors 626, interfaces 628, and/or devices 629 may be attached, and/or communicate with the GVC. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 623. However, memory is a fungible technology and resource, thus, any number of memory embodiments may be employed in lieu of or in concert with one another. It is to be understood that a GVC and/or a computer systemization may employ various forms of memory 623. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, 623 will include ROM 606, RAM 605, and a storage device 614. A storage device 614 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); and/or other devices of the like. Thus, a computer systemization generally requires and makes use of memory.

Module Collection

The memory 623 may contain a collection of program and/or database modules and/or data such as, but not limited to: operating system modules (615 (administration control module); information server module(s) 616 (information server); user interface module(s) 617 (user interface); Web browser module(s) 618 (Web browser); database(s) 619; cryptographic server module(s) 620 (cryptographic server); GVC module(s) 635; and/or the like (i.e., collectively a module collection). These modules may be stored and accessed from the storage devices and/or from storage devices accessible through an interface bus. Although non-conventional software modules such as those in the module collection, typically, are stored in a local storage device 614, they may also be loaded and/or stored in memory such as: peripheral devices, RAM, remote storage facilities through a communications network, ROM, various forms of memory and/or the like.

Operating System

The operating system module 615 is executable program code facilitating the operation of a GVC. Typically, the operating system facilitates access of I/O, network interfaces, peripheral devices, storage devices and/or the like. The operating system may be a highly fault tolerant, scalable, and secure system such as Apple Macintosh OS X (Server), AT&T Plan 9, Be OS, Linux, Unix and/or the like operating systems. However, more limited and/or less secure operating systems also may be employed such as Apple Macintosh OS, Microsoft DOS, Palm OS, Windows 2000/2003/3.1/95/98/CE/Millenium/NT/XP (Server), and/or the like. An operating system may communicate to and/or with other modules in a module collection, including itself, and/or the like. Most frequently, the operating system communicates with other program modules, user interfaces and/or the like. For example, the operating system may contain, communicate, generate, obtain and/or provide program module, system, user and/or data communications, requests and/or responses. The operating system, once executed by the CPU, may enable the interaction with communications networks, data, I/O, peripheral devices, program modules, memory, user input devices, and/or the like. The operating system may provide communications protocols that allow the GVC to communicate with other entities through a communications network 613. Various communication protocols may be used by the GVC as a subcarrier transport mechanism for interaction, such as, but not limited to: multicast, TCP/IP, UDP, unicast and/or the like.

Information Server

An information server module 616 is stored program code that is executed by the CPU. The information server may be a conventional Internet information server such as, but not limited to Apache Software Foundation's Apache, Microsoft's Internet Information Server and/or the like. The information server may allow for the execution of program modules through facilities such as Active Server Page (ASP), ActiveX, (ANSI) (Objective-) C (++), Common Gateway Interface (CGI) scripts, Java, JavaScript, Practical Extraction Report Language (PERL), Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like. The information server provides results in the form of Web pages to Web browsers, and allows for the manipulated generation of the Web pages through interaction with other program modules. After a Domain Name System (DNS) resolution portion of an HTTP request is resolved to a particular information server, the information server resolves requests for information at specified locations on a GVC based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other modules in a module collection, including itself, and/or facilities of the like. Most frequently, the information server communicates with the GVC database 620, operating systems, other program modules, user interfaces, Web browsers, and/or the like.

Access to GVC database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the GVC. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the GVC as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain and/or provide program module, system, user and/or data communications, requests and/or responses.

User Interface

A user interface module 617 is stored program code that is executed by the CPU. The user interface may be a conventional graphic user interface as provided by, with, and/or atop operating systems and/or operating environments such as Apple Macintosh OS, e.g., Aqua, Microsoft Windows (NT/XP), Unix X Windows (KDE, Gnome, and/or the like), and/or the like. The user interface may allow for the display, execution, interaction, manipulation and/or operation of program modules and/or system facilities through textual and/or graphical facilities. The user interface provides a facility through which users may affect, interact and/or operate a computer system. A user interface may communicate to and/or with other modules in a module collection, including itself, and/or facilities of the like. Most frequently, the user interface communicates with operating systems, other program modules and/or the like. The user interface may contain, communicate, generate, obtain and/or provide program module, system, user and/or data communications, requests and/or responses.

Web Browser

A Web browser module 618 is stored program code that is executed by the CPU. The Web browser may be a conventional hypertext viewing application such as Microsoft Internet Explorer or Netscape Navigator. Secure Web browsing may be supplied with 128-bit (or greater) encryption by way of HTTPS, SSL and/or the like. Some Web browsers allow for the execution of program modules through facilities such as Java, JavaScript, ActiveX and/or the like. Web browsers and like information access tools may be integrated into PDAs, cellular telephones, and/or other mobile devices. A Web browser may communicate to and/or with other modules in a module collection, including itself, and/or facilities of the like. Most frequently, the Web browser communicates with information servers, operating systems, integrated program modules (e.g., plug-ins), and/or the like; e.g., it may contain, communicate, generate, obtain, and/or provide program module, system, user, and/or data communications, requests, and/or responses. Of course, in place of a Web browser and information server, a combined application may be developed to perform similar functions of both. The combined application would similarly affect the obtaining and the provision of information to users, user agents, and/or the like from GVC enabled nodes. The combined application may be nugatory on systems employing standard Web browsers.

Cryptographic Server

A cryptographic server module 619 is stored program code that is executed by the CPU 603, cryptographic processor 626, cryptographic processor interface 627, cryptographic processor device 628, and/or the like. Cryptographic processor interfaces will allow for expedition of encryption and/or decryption requests by the cryptographic module; however, the cryptographic module, alternatively, may run on a conventional CPU. The cryptographic module allows for the encryption and/or decryption of provided data. The cryptographic module allows for both symmetric and asymmetric (e.g., Pretty Good Protection (PGP)) encryption and/or decryption. The cryptographic module may employ cryptographic techniques such as, but not limited to: digital certificates (e.g., X.509 authentication framework), digital signatures, dual signatures, enveloping, password access protection, public key management and/or the like. The cryptographic module will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the GVC may encrypt all incoming and/or outgoing communications and may serve as node within a virtual private network (VPN) with a wider communications network. The cryptographic module facilitates the process of "security authorization" whereby access to a resource is inhibited by a security protocol wherein the cryptographic module effects authorized access to the secured resource. In addition, the cryptographic module may provide unique identifiers of content, e.g., employing and MD5 hash to obtain a unique signature for a digital audio file. A cryptographic module may communicate to and/or with other modules in a module collection, including itself, and/or facilities of the like. The cryptographic module supports encryption schemes allowing for the secure transmission of information across a communications network to enable a GVC module to engage in secure transactions if so desired. The cryptographic module facilitates the secure accessing of resources on GVC and facilitates the access of secured resources on remote systems; i.e., it may act as a client and/or server of secured resources. Most frequently, the cryptographic module communicates with information servers, operating systems, other program modules and/or the like. The cryptographic module may contain, communicate, generate, obtain and/or provide program module, system, user and/or data communications, requests and/or responses.

GVC Database

A GVC database module 620 may be embodied in a database and its stored data. The database is stored program code, which is executed by the CPU; the stored program code portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the GVC database may be implemented using various standard data-structures, such as an array, hash, (linked) list, struct, structured text file (e.g., XML), table and/or the like. Such data-structures may be stored in memory and/or in (structured) files. In another alternative, an object-oriented database may be used, such as Frontier, ObjectStore, Poet, Zope and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the GVC database is implemented as a data-structure, the use of the GVC database 620 may be integrated into another module such as the GVC module 635. Also, the database may be implemented as a mix of data structures, objects and relational structures. Databases may be consolidated and/or distributed in countless variations through standard data processing techniques. Portions of databases, e.g., tables, may be exported and/or imported and thus decentralized and/or integrated.

In one embodiment, the database module 620 includes several tables 620*a-d*. An System User table 620*a* includes fields such as, but not limited to: an System_User_ID, Account_ID and/or the like. An Administrator User table 620*b* includes fields such as, but not limited to: Administrator_ID, Subscriber_List, Catalog_List, VM_Ratings, and/or the like. A Finance table 620*c* includes fields such as, but not limited to: Equity_List, Int_Bear_Intsr_List, and/or the like. An Chart table 620*d* includes information directed to historical financial data used in create charts to assist in financial analysis. The database module includes other tables and relations as already discussed in FIG. 1 and throughout the disclosure.

In one embodiment, user programs may contain various user interface primitives, which may serve to update GVC. Also, various accounts may require custom database tables depending upon the environments and the types of clients a GVC may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database modules 620*a-d*. The GVC may be configured to keep track of various settings, inputs and parameters via database controllers.

A GVC database may communicate to and/or with other modules in a module collection, including itself, and/or facilities. of the like. Most frequently, the GVC database communicates with a GVC module, other program modules and/or the like. The database may contain, retain and provide information regarding other nodes and data.

Growth Valuation

A GVC module 635 is stored program code that is executed by the CPU. The GVC module affects accessing, obtaining and the provision of information, services, transactions and/or the like across various communications networks.

A GVC module enabling access of valuation metric data between nodes may be developed by employing standard development tools such as, but not limited to: (ANSI) (Objective-) C (++), Apache modules, binary executables, database adapters, Java, JavaScript, mapping tools, procedural and object oriented development tools, PERL, Python, shell scripts, SQL commands, web application server extensions, WebObjects, and/or the like. In one embodiment, the GVC controller employs a cryptographic server to encrypt and decrypt communications. A GVC module may communicate to and/or with other modules in a module collection, including itself, and/or facilities of the like. Most frequently, the GVC module communicates with a GVC database, operating systems, other program modules and/or the like. The GVC may contain, communicate, generate, obtain and/or provide program module, system, user and/or data communications, requests and/or responses.

Distributed GVC

The structure and/or operation of any of the GVC node controller components may be combined, consolidated and/or distributed in any number of ways to facilitate development and/or deployment. Similarly, the module collection may be combined in any number of ways to facilitate deployment and/or development. To accomplish this, one may integrate the components into a common code base or in a facility that can dynamically load the components on demand in an integrated fashion.

The module collection may be consolidated and/or distributed in countless variations through standard data processing and/or development techniques. Multiple instances of any one of the program modules in the program module collection may be instantiated on a single node, and/or across numerous nodes to improve performance through load-balancing and/or data-processing techniques. Furthermore, single instances may also be distributed across multiple controllers and/or storage devices; e.g., databases. All program module instances and controllers working in concert may do so through standard data processing communication techniques.

The configuration of the GVC will depend on the context of system deployment. Factors such as, but not limited to, the budget, capacity, location and/or use of the underlying hardware resources may affect deployment requirements and configuration. Regardless of if the configuration results in more consolidated and/or integrated program modules, results in a more distributed series of program modules, and/or results in some combination between a consolidated and distributed configuration, data may be communicated, obtained, and/or provided. Instances of modules consolidated into a common code base from the program module collection may communicate, obtain and/or provide data. This may be accomplished through intra-application data processing communication techniques such as, but not limited to: data referencing (e.g., pointers), internal messaging, object instance variable communication, shared memory space, variable passing, and/or the like.

If module collection components are discrete, separate, and/or external to one another, then communicating, obtaining, and/or providing data with and/or to other module components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), process pipes, shared files, and/or the like. Messages sent between discrete module components for inter-application communication or within memory spaces of a singular module for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between modules. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of space and reducing repetition. For instance, it is to be understood that the logical and/or topological structure of any combination of any program modules (a module collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

We claim:

1. A computerized system for distributing a financial valuation metric for use in determining an investment strategy and analyzing an investment portfolio comprising: a memory device; and a processor disposed in communication with the memory device, the processor configured to:

designate system characteristics including an interest rate factor, an earnings-yield factor, and a growth rate factor;

determine the financial valuation metric based on the factors according to the formula:

valuation metric=Earnings Yield+Growth Rate−Interest Rate wherein the Earnings Yield comprises a forward earnings yield associated with an equity security or an equity security index, the Growth Rate comprises an estimated earnings growth rate of the value of the equity security or the equity security index, and the Interest Rate comprises a yield-to-maturity on a selected fixed-income security; and following determination of the valuation metric, using the valuation metric to determine an investment strategy and analyze an investment portfolio.

2. The system of claim 1, wherein the processor is further configured to distribute the valuation metric based on a subscription service.

3. The system of claim 1, wherein the system characteristics are established for a subscriber through an administration session.

4. The system of claim 1, wherein processor is configured to establish system characteristics by a user.

5. The system of claim 3, wherein the processor is configured to create a series of valuation metrics based on different system characteristics.

6. The system of claim 5, wherein the series of valuation metrics are cataloged according to a risk/volatility factor.

7. The system of claim 6, wherein the processor is configured to process a system user request to receive at least one of the multiple valuation metrics.

8. The system of claim 4, wherein the processor is configured to provide a system user with a list of predetermined system characteristics for determining the valuation metric.

9. The system of claim 8, wherein the processor is configured to receive a system user request that includes system user designed system characteristics for determining the valuation metric.

10. The system of claim 1, wherein the interest rate factor is the 10-year US Treasury note/bond.

11. The system of claim 1, wherein the earnings-yield factor is associated with any domestic or foreign based indexes.

12. The system of claim 1, wherein growth rate factor is implemented as a twenty-year historical average growth rate.

13. A computerized method for distributing a financial valuation metric for use in determining an investment strategy and analyzing an investment portfolio comprising:
   obtaining characteristics including an interest rate factor, an earnings-yield factor, and a growth rate factor using a computer;
   determining, using the computer, the financial valuation metric based on the factors according to the formula:

valuation metric=Earnings Yield+Growth Rate−Interest Rate wherein the Earnings Yield comprises a forward earnings yield associated with an equity security or an equity security index, the Growth Rate comprises an estimated earnings growth rate of the value of the equity security or the equity security index, and the Interest Rate comprises a yield-to-maturity on a selected fixed-income security; and
   distributing the determined valuation metric to a system user wherein the user will use the valuation metric in determining an investment strategy and analyzing an investment portfolio.

14. The method of claim 13, further comprising distributing the valuation metric based on a subscription service.

15. The method of claim 13, wherein the system characteristics are established for a subscriber through an administration session.

16. The method of claim 13, further comprising establishing system characteristics by a system user.

17. The method of claim 15, further comprising creating a series of valuation metrics based on different system characteristics.

18. The method of claim 17, wherein the series of valuation metrics are cataloged according to a risk/volatility factor.

19. The method of claim 18, further comprising receiving a system user request to receive at least one of the multiple valuation metrics.

20. The method of claim 16, further comprising providing a system user with a list of predetermined system characteristics for determining the valuation metric.

21. The method of claim 20, further comprising receiving a system user request that includes system user designated system characteristics for determining the valuation metric.

22. The method of claim 13 wherein the interest rate factor is the 10-year US Treasury note/bond.

23. The method of claim 13, wherein the earnings-yield factor is associated with any domestic or foreign based indexes.

24. The method of claim 13, wherein the growth rate factor is implemented as a twenty-year historical average growth rate.

25. A non-transitory computer-readable medium having computer-executable instructions for performing a method for distributing a financial valuation metric for use in determining an investment strategy and analyzing an investment portfolio comprising:
   designating system characteristics including an interest rate factor, an earnings-yield factor, and a growth rate factor;
   determining the financial valuation metric based on the factors according to the formula:

valuation metric=Earnings Yield+Growth Rate−Interest Rate wherein the Earnings Yield comprises a forward earnings yield associated with an equity security or an equity security index, the Growth Rate comprises an estimated earnings growth rate of the value of the equity security or the equity security index, and the Interest Rate comprises a yield-to-maturity on a selected fixed-income security; and using the valuation metric to determine an investment strategy and analyzing an investment portfolio.

26. The non-transitory computer-readable medium of claim 25 further comprising computer-executable instructions for performing distributing the valuation metric based on a subscription service.

27. The non-transitory computer-readable medium of claim 25, wherein the system characteristics are established for a subscriber through an administration session.

28. The non-transitory computer-readable medium of claim 25, further comprising computer-executable instructions for establishing system characteristics by a system user.

29. The non-transitory computer-readable medium of claim 27, further comprising computer-executable instructions for creating a series of valuation metrics based on different system characteristics.

30. The non-transitory computer-readable medium of claim 29, wherein the series of valuation metrics are cataloged according to a risk/volatility factor.

31. The non-transitory computer-readable medium of claim 28, further comprising computer-executable instructions for receiving a system user request to receive at least one of the multiple valuation metrics.

32. The non-transitory computer-readable medium of claim 28, further comprising computer-executable instructions for providing a system user with a list of predetermined system characteristics for determining the valuation metric.

33. The non-transitory computer-readable medium of claim 32, further comprising computer-executable instructions for receiving a system user request that includes system user designated system characteristics for determining the valuation metric.

34. The non-transitory computer-readable medium of claim 25, wherein the interest rate factor is the 10-year US Treasury note/bond.

35. The non-transitory computer-readable medium of claim 25, wherein the earnings-yield factor is associated with any domestic or foreign based indexes.

36. The non-transitory computer-readable medium of claim 25, wherein the growth rate factor is implemented as a twenty-year historical average growth rate.

37. The system of claim 1, wherein the growth rate factor is a weighted growth rate.

38. The method of claim 13, wherein the growth rate factor is a weighted growth rate.

39. The non-transitory computer-readable medium of claim 25, wherein the growth rate factor is a weighted growth rate.

* * * * *